United States Patent [19]

Mihara et al.

[11] Patent Number: 4,862,294
[45] Date of Patent: Aug. 29, 1989

[54] DISC ERASING APPARATUS FOR SELECTIVE ERASURE OF DISC TRACKS

[75] Inventors: Yoshikazu Mihara, Yawata; Hiroshi Nakashima, Hirakata, both of Japan

[73] Assignee: Sanyo Electric Co., Ltd., Moriguchi, Japan

[21] Appl. No.: 35,534

[22] Filed: Apr. 7, 1987

[30] Foreign Application Priority Data

Apr. 19, 1986 [JP] Japan ................. 61-59259[U]

[51] Int. Cl.$^4$ .................... H04N 5/781; G11B 21/10
[52] U.S. Cl. ..................... 360/35.1; 360/77.02; 360/66; 358/342; 358/906; 358/909; 369/44
[58] Field of Search ............. 358/335, 342, 906, 909; 360/33.1, 35.1, 70, 75, 77, 66; 369/44, 46

[56] References Cited

U.S. PATENT DOCUMENTS

| | | | |
|---|---|---|---|
| 4,000,510 | 12/1976 | Cheney et al. | 360/33.1 X |
| 4,115,818 | 9/1978 | Lesieur | 360/35.1 X |
| 4,602,296 | 7/1986 | Murakoshi | 358/335 X |
| 4,613,963 | 9/1986 | Hirano | 369/44 |
| 4,717,975 | 1/1988 | Ogura et al. | 360/66 |
| 4,745,588 | 5/1988 | Yoshikawa et al. | 360/77 X |

FOREIGN PATENT DOCUMENTS 53-59406  5/1978  Japan .
56-16946  2/1981  Japan .
59-52404  3/1984  Japan .

OTHER PUBLICATIONS

"The Electronic Still Camera A New Concept in Photography", IEEE Transactions on Consumer Electronics, vol. CE-28, No. 3, Aug., 1982, pp. 325–331.

"An Electronic Still Camera System", IEEE Transactions on Consumer Electronics, vol. CE-32, No. 3, Aug., 1986, pp. 345–354.

Primary Examiner—Alan Faber
Assistant Examiner—W. R. Young
Attorney, Agent, or Firm—Armstrong, Nikaido, Marmelstein & Kubovcik

[57] ABSTRACT

In an electronic still camera system, a plurality of circular tracks are performed on a magnetic disc and the magnetic head 1 is used for both reproduction and erasing of the disc. When any one of the tracks is selectively erased, the reproducing operation is set by a control circuit 16 and tracking control of the magnetic head 1 is performed by a tracking servo circuit 5 of a Dither system. The DC component of a tracking control signal in an on-track state, that is, a signal DC' showing the average trace position of the magnetic head 1 on the disc is held in a sample and hold circuit 8. In addition, an oscillator 10 generates an AC signal AC' with an amplitude which moves the magnetic head 1 by the predetermined maximum amount d of track deviation. After a lapse of a predetermined period, tracking control of the magnetic head 1 is performed by a combined signal of the DC signal DC' and the AC signal AC' and reproduction operation is switched into erasing operation, so that the target track is erased.

19 Claims, 4 Drawing Sheets

DISC ERASING APPARATUS FOR SELECTIVE ERASURE OF DISC TRACKS

BACKGROUND OF THE INVENTION

1. Field of the Invention

The present invention relates to a disc erasing apparatus and more particularly, to an apparatus for erasing a record of each track in a disc such as a magnetic disc used in an electronic still camera in which a plurality of tracks are formed concentrically.

2. Description of the Prior Art

Recently, an electronic still camera has been developed, which is disclosed in, for example, an article by N. Kihara et al., entitled "THE ELECTRONIC STILL CAMERA A NEW CONCEPT IN PHOTOGRAPHY", IEEE Transactions on Consumer Electronics, Vol. CE-28, No. 3, Aug. 1982, pp. 325-331. Such an electronic still camera is adapted such that a plurality of tracks are formed concentrically on a magnetic disc and signals for a field or a frame of an imaged still picture are recorded on each track.

More specifically, since a magnetic disc is used in the electronic still camera as a recording medium as described above, recording, reproducing and erasing can be performed, unlike a conventional image film. It has been proposed that the electronic still camera is provided with an erasing function as well as recording and reproducing functions to, for example, selectively erase a record of each track of a recorded magnetic disc, so that editing of the record may be performed.

In order to provide the function for erasing a record of each track, a magnetic head for erasing only may be provided independently of a magnetic head for recording and reproduction. However, if such a head for erasing only is provided, the number of heads increases, so that the entire structure of the apparatus is complicated.

At the time of reproduction of the magnetic disc, tracking control is generally performed to prevent decrease in the reproduced output due to deviation of track. As one system for performing tracking control, a Dither system is disclosed in, for example, an article by T. Tanaka et al., entitled "AN ELECTRONIC STILL CAMERA SYSTEM", IEEE Transactions on Consumer Electronics, Vol. CE-32, No. 3, Aug. 1986 pp. 345-354. However, when erasing is performed utilizing the head for erasing only as described above, the reproduced signal cannot be obtained from the magnetic disc and thus tracking control of the magnetic head can not be performed. More specifically, when a track to be erased is selected, the position of the head is generally fixed to a position set by accessing the track to be erased or the like, so that erasing is performed. However, if tracking control of the magnetic head is not performed at the time of erasing as described above, the actual trace position of the magnetic head at the time of erasing cannot easily correspond to a target track to be erased due to positional deviation of track caused by a positional error of the accessed head and eccentricity of the magnetic disc, so that a record of the track cannot be surely erased.

In order to solve the problems, the following has been proposed.

First, a single magnetic head used for either one or both of recording and reproduction is also used for erasing, and the magnetic head is attached to an electromechanical transducer such as a bimorph piezo-electric element, so that the magnetic head is moved in a width direction of the track to be erased, that is, in a radial direction of the magnetic disc at the time of erasing, which is proposed in, for example, Japanese Patent Laying-Open Gazette No. 59406/1978. According to the just-described method, erasing is performed wider than the track to be erased without providing the head for erasing only, so that the record of the track can be surely erased.

Secondly, means for transporting the magnetic head from a track to the next track in a plurality of steps is provided, so that every time the trace position of the magnetic head is moved sequentially to the position in each step associated with the target track to be erased at the time of erasing, erasing operation is repeated, which is proposed in, for example, Japanese Patent Laying-Open Gazette No. 52404/1984. According to the just-described method, the erasing is performed wider than the track to be erased, so that the record of the track can be surely erased.

Thirdly, a tracking control signal following a distorted shape of the track due to eccentricity or the like is perfectly stored in advance in the waveform storing means, so that the trace position of the head is changed following the distorted shape of the track, which is proposed in, for example, Japanese Patent Laying-Open Gazette No. 16946/1981.

However, according to the above described first and second methods, in order to erase surely the record of the target track, the width to be erased must be set to be considerably wider than the actual track width in consideration of the above described track deviation due to a positional error of the accessed head, eccentricity or the like. In this case, a record of an adjacent track is liable to be partially erased by such erasing.

In addition, according to the above described third method, waveform storing means for storing a tracking control signal for the entire position of the track to be erased and the like must be provided, so that a structure of the apparatus is complicated. Furthermore, if tracking accuracy and storage accuracy are not very high, good tracking control cannot be performed, which presents a great difficulty at the time of manufacturing.

SUMMARY OF THE INVENTION

Briefly stated, the present invention provides an apparatus for erasing selectively each record of a plurality of tracks formed concentrically on a disc, comprising a head used at least for both reproduction and erasing of the record of the track, head moving means for moving the head in a radial direction of the disc and controlling movably the trace position of the head on the disc, tracking servo means for outputting a tracking control signal including at least a DC signal component, which changes in amplitude following deviation between the actual trace position of the head and the position of the track reproduced by the head in response to the signal reproduced from the track by the head, means for inputting an erase command signal, operation controlling means for performing reproducing operation by the head of the track to be erased, supplying a tracking control signal outputted from the tracking servo means to the head moving means to drive the head moving means in response to the erase command signal, and further switching the reproducing operation into erasing operation performed by the head after a lapse of a predetermined sufficient time period to control the trace position to the position of the track to be erased, signal holding means for holding the DC signal component of the tracking control signal when the predetermined time period is lapsed, AC generating means for generating an AC signal with a predetermined amplitude, and switching means for combining the DC signal component held in the signal holding means and the AC signal generated by the AC generating means and supplying the head moving means with the combined signal instead of the tracking control signal to drive the head moving means after a lapse of the predetermined time period.

In accordance with another aspect of the present invention, the tracking control signal further includes the AC signal component.

In accordance with still another aspect of the present invention, the DC signal component of the tracking control signal represents an average trace position of the head on the disc and the AC signal component of the tracking control signal represents the amount of movement of the head from the average trace position.

In accordance with still another aspect of the present invention, a predetermined amplitude of the AC signal generated from the AC generating means is set such that the head is moved by the range of the maximum amount of track deviation set in advance when the AC signal is applied to the head moving means.

In accordance with still another aspect of the present invention, a predetermined amplitude of the AC signal generated from the AC generating means is set such that the head is moved by the range of the measured maximum amount of track deviation when the AC signal is applied to the head moving means.

In accordance with yet still another aspect of the present invention, the tracking servo means comprises a tracking servo circuit of a Dither system.

Therefore, a primary object of the present invention is to provide a disc erasing apparatus capable of erasing surely only the record of the target track to be erased without erasing a record of an adjacent track on the disc.

A principal advantage of the present invention is that since the track to be erased is reproduced once before erasing operation to perform tracking control and the DC signal component of the tracking control signal at that time is held and combined with the AC signal with a predetermined amplitude to control the head moving means, the trace position of the head is controlled in the center of the target track to be erased and the head is moved, by the maximum amount of deviation of the track from the central position of the track in a radial direction of the disc, so that only the record of the target track to be erased can be surely erased without erasing a record of an adjacent track.

Another advantage of the present invention is that since it is sufficient to hold only the DC signal component of the tracking control signal to trace the average center of the track to be erased and it is not necessary to store perfectly the tracking control signal, a structure of the apparatus can be remarkably simplified.

Still another advantage of the present invention is that since components of the conventional tracking servo means are used for both the DC signal component holding means and the AC generating means, a structure of the apparatus can be further simplified.

Still another advantage of the present invention is that since the movable range of the head is set by the maximum amount of track deviation actually measured, the erasing range can be determined with higher accuracy.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
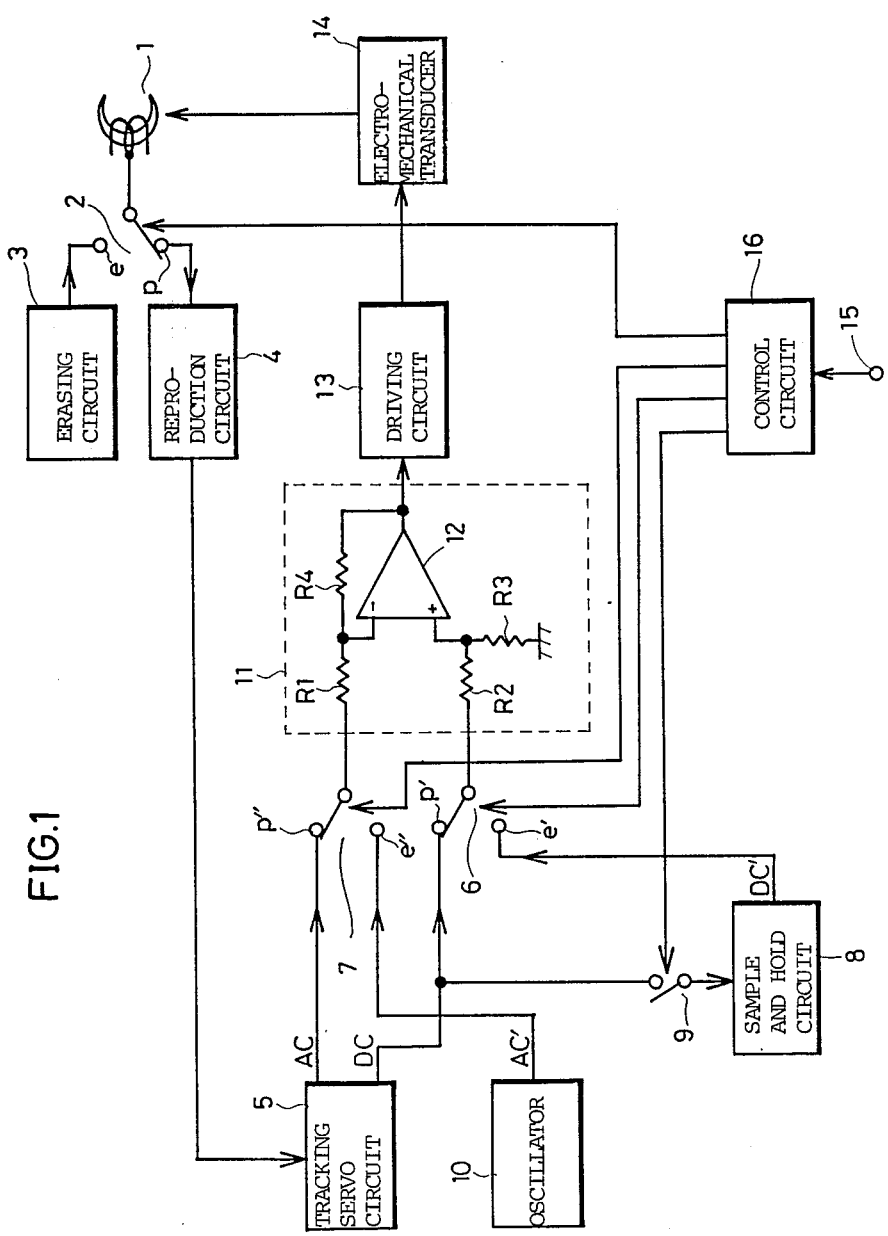
FIG. 1 is a schematic block diagram showing a disc erasing apparatus according to an embodiment of the present invention.

FIG. 1 is a schematic block diagram showing a disc erasing apparatus of an electronic still camera system according to an embodiment of the present invention.

Referring now to FIG. 1, description is made on a structure of the disc erasing apparatus according to an embodiment of the present invention.

In the electronic still camera system shown in FIG. 1, a magnetic head 1 is used for at least both reproduction and erasing of a magnetic disc (not shown) and is connected to a switching piece of a switch 2 for switching reproduction/erasing. In addition, the switch 2 for switching reproduction/erasing has a contact p on the side of reproduction and a contact e on the side of erasing. An erasing circuit 3 outputs a predetermined erasing signal for erasing a record of a track on a disc and applies the same to the contact e on the side of erasing of the switch 2 for switching reproduction/erasing. Furthermore, a reproduction circuit 4 processes a reproduced signal inputted from the contact p on the side of reproduction of the switch 2 for switching reproduction/erasing and outputs the same.

The reproduced signal reproduced by the magnetic head 1 and processed in the reproduction circuit 4 is applied to a tracking servo circuit 5. The tracking servo circuit 5 is of the above described known Dither system, and separates a tracking control signal which changes in amplitude following deviation between the trace position of the magnetic head 1 on the disc and the position of the track under reproduction into a DC component and an AC component and outputs the same. An output of the DC component is inputted to a contact p' on the side of reproduction of a first switch 6 for switching tracking and an output of the AC component is inputted to the contact p'' on the side of reproduction of a second switch 7 for switching tracking.

Furthermore, the DC component of the tracking servo circuit 5 of a Dither system is applied to a sample and hold circuit 8 through a sampling switch 9, the switch 9 and the sample and hold circuit 8 constituting signal holding means. When the switch 9 is closed, the signal DC of the DC component outputted from the tracking servo circuit 5 is sampled and held by the sample and hold circuit 8, the held signal DC' of the DC component is outputted to a contact e' on the side of erasing of the switch 6.

On the other hand, an oscillator 10 generates an AC signal AC' with a predetermined amplitude and applies the same to a contact e" on the side of erasing of the switch 7.

Additionally, the respective switching pieces of the switches 6 and 7 are connected to an adder circuit 10 formed using an operational amplifier 12. More specifically, in the adder circuit 11, an inversion input terminal (−) of the operational amplifier 12 is connected to the switching piece of the switch 7 through a resistor R1 and a non-inversion input terminal (+) thereof is connected to a node of resistors R2 and R3 connected in series between the switching piece of the switch 6 and an earth potential, a resistor R4 for setting gain being provided between the inversion input terminal (−) and an output terminal of the operational amplifier 12.

An output signal of the operational amplifier 12 is applied to a driving circuit 13, which drives an electro-mechanical transducer 14 comprising a bimorph or a piezo-electric actuator of stacked type and the like in response to the output signal. The driving circuit 13 and the electro-mechanical transducer 14 constitute head moving means. The magnetic head 1 is attached to the electro-mechanical transducer 14, which is attached to a conventional actuator for head access. The electro-mechanical transducer 14 moves the trace position of the magnetic head 1 on the disc in a radial direction of the disc in response to a driving signal from the driving circuit 13.

When erasing operation of the disc is set, an erasing command signal is inputted to an input terminal 15 accordingly, so that a control circuit 16 controls switching or opening/closing of each switch 2, 6, 7, 9 in response to the erase command signal. The switch 2 and the control circuit 16 constitute operation controlling means, and the switches 6 and 7, the adder circuit 11 and the control circuit 16 constitute switching means.

Figure 2:
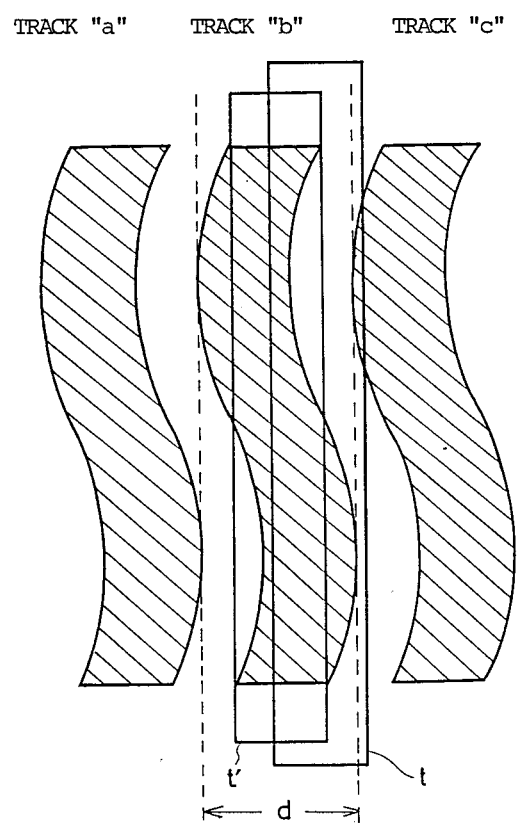
FIG. 2 is a schematic diagram showing a track pattern on the disc in the embodiment shown in FIG. 1.

FIG. 2 is a diagram showing schematically a track pattern on the disc in the embodiment shown in FIG. 1.

Referring now to FIGS. 1 and 2, description is made on operation according to an embodiment of the present invention. In FIG. 2, a plurality of circular tracks a to c formed on the magnetic disc of the electronic still camera are shown developed, respectively. It is assumed that if there is no deviation of the position, the tracks a to c have straight shapes, respectively. If deviation occurs on each track due to eccentricity of the disc or the like, the tracks a, b and c curve, respectively, as shown in FIG. 2.

For example, when the record of the track b is erased, the target track b to be erased is accessed. Correspondingly, a conventional actuator for head access (not shown) is moved, so that the magnetic head 1 is moved to, for example, the trace position represented by a solid line t in FIG. 2. If the track b is erased in this state without operating the electro-mechanical transducer 14, a part of the track b is not erased and a part of the adjacent track c is erased due to a positional error of the accessed head or the like.

According to the present embodiment, when the erase command signal is inputted to the input terminal 15, the control circuit 16 switches the switches 2, 6 and 7 into contacts p, p' and p" on the side of reproduction, so that the switch 9 is closed. More specifically, before erasing operation of the track b is started, reproducing operation of the track b is set once, so that reproduction of the track is started.

A signal reproduced by the magnetic head 1 is inputted to the tracking servo circuit 5 through the reproduction circuit 4, the tracking servo circuit 5 forming a tracking control signal which changes in amplitude following deviation between the trace position of the magnetic head 1 and the track b under reproduction. The tracking servo circuit 5 separates the signal DC of the DC component and the signal AC of the AC component of the tracking control signal and outputs the same, the signals being inputted to the adder circuit 11 through the switches 6 and 7.

The adder circuit 11 adds the inputted signal DC of the DC component to the inputted signal AC of the AC component, respectively, to form a combined signal, i.e., the tracking control signal and applies the same to the driving circuit 13. Correspondingly, the driving circuit 13 applies the driving signal to the electro-mechanical transducer 14, which moves the magnetic head 1 so that the trace position of the magnetic head 1 may be controlled to the position of the track b.

When the electro-mechanical transducer 14 is displaced in response to the driving signal of the driving circuit 13, the trace position of the magnetic head 1 is moved in a radial direction of the disc so that it may follow the position of the track b. After one to several turns of the disc since reproduction was started, a servo is stabilized, so that the magnetic head 1 is controlled to a so-called on-track state.

The signal DC of the DC component in the tracking control signal outputted from the tracking servo circuit 5 shows the average trace position on the disc of the magnetic head 1 while the signal AC of the AC component shows the amount of movement from the average trace position. When the magnetic head 1 is controlled by the tracking control signal and is maintained in the on-track position as described above, the magnetic head 1 traces correctly the track b, so that the signal DC of the DC component in the tracking control signal at that time controls the average trace position of the magnetic head 1 to the position represented by a solid line t' in FIG. 2, that is, the position where the average center of the track b is traced.

On the other hand, during a reproducing period, the switch 9 is closed, so that the signal DC of the DC component in the tracking control signal is also inputted to the sample and hold circuit 8.

After a lapse of a predetermined period since reproduction operation was started by inputting the above described erase command signal, that is, a sufficient time period for the magnetic head 1 to be in the on-track state by tracking control, the control circuit 16 controls the switch 9 so that it may be opened. Therefore, the signal DC of the DC component of the tracking control signal when the magnetic head 1 is controlled to be in the on-track position, i.e. the signal of the DC component corresponding to the average central position of the track b is sampled and held in the sample and hold circuit 8. After the switch 9 is opened, the signal of the DC component sampled and held is applied to the contact e' on the side of erasing of the switch 6 as the signal DC'.

Furthermore, the control circuit 16 controls the switch 9 so that it may be opened and at the same time, controls the switches 6 and 7 so that they may be switched from the contacts p' and p" on the side of reproduction to the contacts e' and e" on the side of erasing. Therefore, the signal inputted to the driving circuit 13 through the adder circuit 11 is switched from the tracking servo signal outputted from the tracking servo circuit 5 to the combined signal of the DC signal DC' of the sample and hold circuit 8 and the AC signal AC' of the oscillator 10.

The range of the amount of deviation from the average center of each track due to eccentricity or the like can be expected based on the manufacturing standard or the like. The maximum amplitude of the AC signal AC' outputted from the oscillator 10 is set in advance such that the magnetic head 1 may be moved by a range of the expected maximum amount of track deviation (represented by d in FIG. 2).

Therefore, when the switches 6 and 7 are switched into the contacts e' and e" on the side of erasing, respectively, the magnetic head 1 is tracking-controlled by the combined signal of the DC signal DC' and the AC signal AC'. At that time, the trace position of the magnetic head 1 is moved in a radial direction of the disc within a range of the maximum amount d of track deviation with respect to the average central position represented by the solid line t' in FIG. 2.

The speed of radial movement of the trace position is defined by the frequency of the AC signal AC', the frequency being determined by a moving way of the magnetic head 1 at the time of erasing, as described below. More specifically, when the magnetic head 1 is always moved in a radial direction so that the track b is traced in a zigzag manner and is erased, the frequency of the AC signal AC' is set high. On the other hand, when the magnetic head 1 is moved, for example, from the outside to the inside of the range d in a step manner for every one rotation of the disc so that the track b is traced in a step manner and is erased, the frequency of the AC signal AC' is set low.

When tracking control of the magnetic head 1 is started by the combined signal of the DC signal DC' and the AC signal AC', the control circuit 16 controls the switch 2 and switches the same into the contact e on the side of erasing, so that reproduction operation is switched into erasing operation. The erasing signal of the erasing circuit 3 is supplied to the magnetic head 1 through the switch 2, so that erasing of the record of the track b is started.

Therefore, at the time of erasing of the track b, tracking control is performed in response to the combined signal of the DC signal DC' and the AC signal AC', so that the trace position of the magnetic head 1 is moved in a radial direction of the disc within a range of the maximum amount d of track deviation with respect to the average central position of the track b. As a result, only a record of the target track b to be erased can be surely erased completely without erasing records of the adjacent tracks a and c.

Instead of storing completely the tracking control signal following positional deviation of the track b erased in a conventional manner, only the signal of the DC component for tracing the average center of the track b is held in the sample and hold circuit 8 and tracking control is performed in response to this signal, only the record of a target track can be surely erased using a simple structure which can be easily manufactured.

Erasing is stopped by setting of predetermined operation or automatic control.

Returning to the time of ordinary reproduction, the switches 2, 6 and 7 are held in the contacts p, p' and p" on the side of reproduction, respectively, so that the trace position of the magnetic head 1 is controlled by the tracking control signal of the tracking servo circuit 5.

Figure 3:
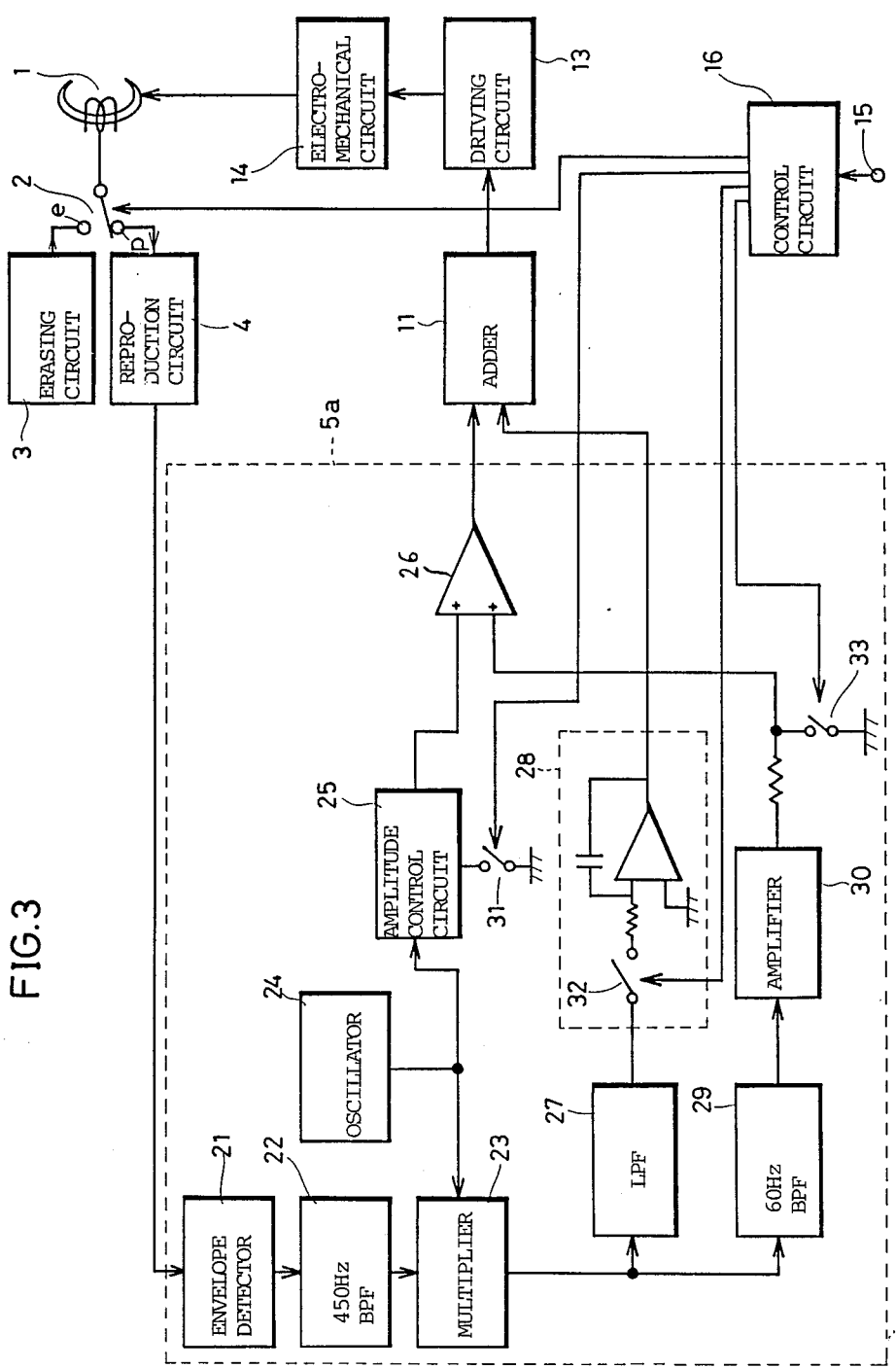
FIG. 3 is a schematic block diagram showing a disc erasing apparatus according to a second embodiment of the present invention.

FIG. 3 is a block diagram showing the disc erasing apparatus of the electronic still camera according to a second embodiment of the present invention.

A structure of the disc erasing apparatus shown in FIG. 3 is the same as that according to the first embodiment shown in FIG. 1 except for the following.

More specifically, the tracking servo circuit 5 in FIG. 1 is of the well-known Dither system as described above, which structure is disclosed in the above described document. According to the embodiment shown in FIG. 3, the tracking servo circuit 5a of the Dither system is adapted such that the original components of the tracking servo circuit are used for both DC component signal holding means and AC signal generating means.

More specifically, at the time of erasing of the track, the control circuit 16 switches the contact of the switch 2 into the contact p on the side of reproduction in response to the erase command signal applied to the input terminal 15, as in the embodiment shown in FIG. 1, so that reproducing operation of the track is set. The signal reproduced by the magnetic head 1 is applied to an envelope detector 21 of the tracking servo circuit 5a through the switch 2 and the reproduction circuit 4. An output of the envelope detector 21 is applied to a multiplier 23 through a band-pass filter for 450 Hz. An oscillator 24 generates a sine wave with 450 Hz frequency and applies the same to the multiplier 23, so that synchronous detection of the reproduced signal is performed. The AC signal with 450 Hz is applied to the driving circuit 13 through an amplitude control circuit 25, and an adder 26 and the adding circuit 11. More specifically, when the magnetic head 1 is vibrated in a radial direction of the disc, the reproduced output by the head is changed. When the product of the changed amount and the AC signal for vibrating the magnetic head 1 is taken in the multiplier 23, an error signal corresponding to track deviation is separated from the reproduced signal. The error signal comprises two components. After the low frequency component thereof is separated by a low pass filter 27 and is integrated by an integration circuit 28, it is applied to one input of the adder circuit 11 as a DC component for correcting static track deviation. The adder circuit 11 has the same structure as that shown in FIG. 1. After the AC component with 60 Hz (the rotational frequency of a disc) which is the other component of the error signal is separated by a band-pass filter 29 for 60 Hz and is amplified by an amplifier 30, it is applied to the adder 26 as an AC component for correcting dynamic track deviation due to eccentricity or the like and is added to the above described AC component for 450 Hz. An output of the adder 26 is outputted as an AC component of the tracking servo circuit 5a and is applied to the other input of the adder circuit 11. Thereafter, as in the embodiment shown in FIG. 1, the electro-mechanical transducer 14 is driven by an output of the adder circuit 11, so that tracking control of the magnetic head 1 is performed.

After a lapse of a sufficient time period for the magnetic head 1 to be controlled to the on-track state, the control circuit 16 controls switches 31 and 32 so that they are opened, respectively, and controls a switch 33 so that it is closed. Thereafter, an input to the integration circuit 28 is disconnected, the integration circuit 28 functioning as signal holding means in the same manner as the sample and hold circuit 8 in FIG. 1. In addition, at the time of tracking control before the switch 31 is opened, the AC signal with a very small amplitude is outputted from the amplitude control circuit 25, so that control in a radial direction is performed. After the switch 31 is opened, the oscillator 24 functions as the oscillator 10 in FIG. 1, so that the AC signal with a large constant amplitude is applied to one input of the adder 26 through the amplitude control circuit 25. On the other hand, when the switch 33 is closed, the AC component with 60 Hz which is an output of the amplifier 30 is disconnected from the adder 26. The output of the adder 26 is applied to the other input terminal of the adder circuit 11 and is combined with the DC component at the time of on-track held in the integration circuit 28 to control the electro-mechanical transducer 14, so that the magnetic head 1 is controlled in the on-track state. As in the embodiment shown in FIG. 1, the switch 2 is switched into the contact e on the side of erasing, so that the track b is erased.

Therefore, according to the embodiment shown in FIG. 3, at the time of erasing the track b, the trace position of the magnetic head 1 is moved in a radial direction of the disc within a range of the maximum amount d of track deviation with respect to the average central position of the track b by tracking control responsive to the combined signal of the DC signal and the AC signal, so that only the record of the target track b to be erased can be surely erased without erasing records of the adjacent tracks. In addition, components of the tracking servo circuit are used for both the signal holding means and the AC generating means, so that the structure of the erasing apparatus can be simplified.

Figure 4:
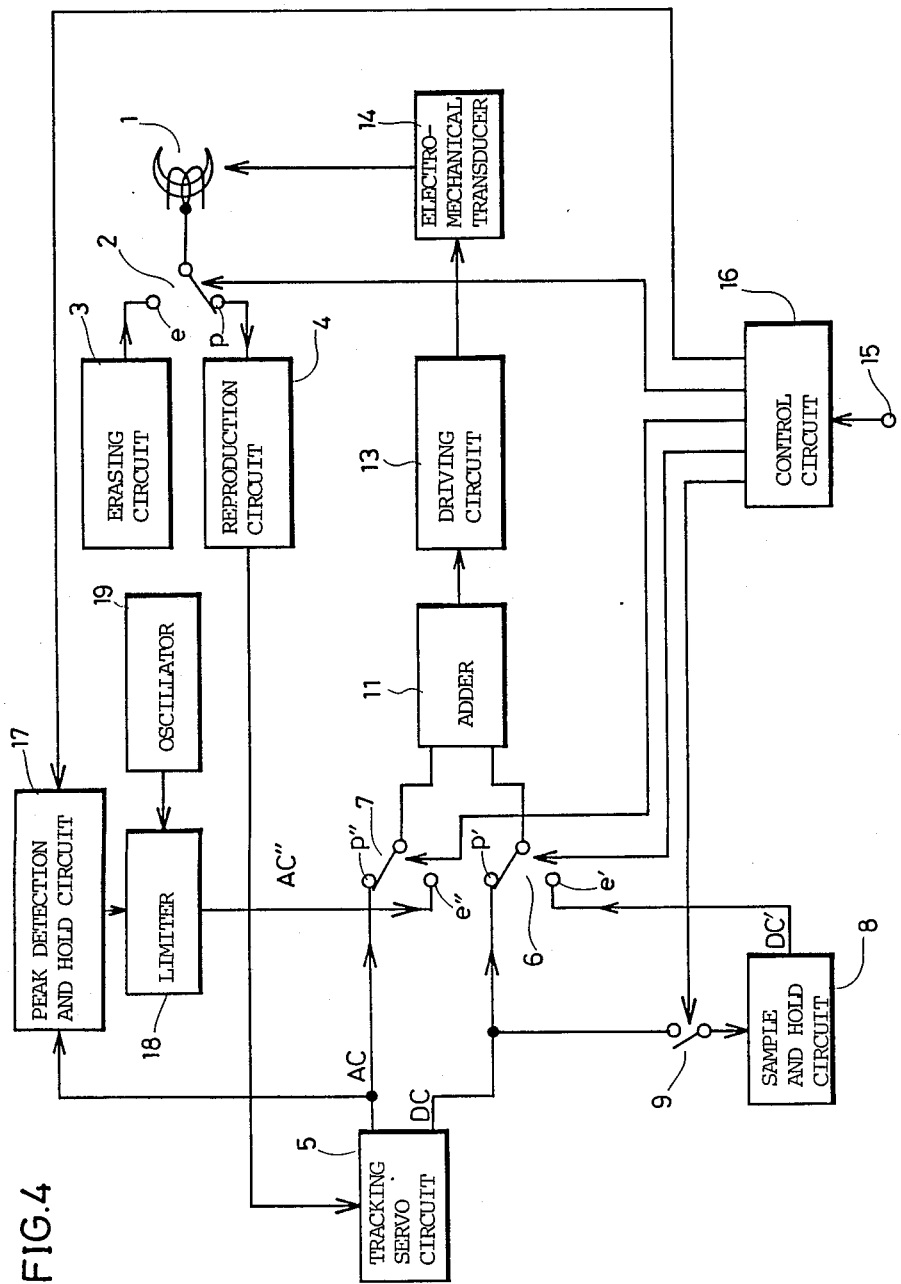
FIG. 4 is a schematic block diagram showing a disc erasing apparatus according to a third embodiment of the present invention.

FIG. 4 is a block diagram showing the disc erasing apparatus of the electronic still camera system according to a third embodiment of the present invention.

The structure of the disc erasing apparatus shown in FIG. 4 is the same as that according to the first embodiment shown in FIG. 1 except for the following.

More specifically, a peak detection and hold circuit 17, a limiter 18 and an oscillator 19 are provided instead of the oscillator 10 in FIG. 1, so that the range of movement of the magnetic head 1 at the time of erasing is determined by actually measuring the maximum amount d of track deviation in FIG. 2.

More specifically, when the record of, for example, the track b (FIG. 2) on the disc is erased, the magnetic head 1 is controlled in the trace position represented by the solid line t (FIG. 2) in response to accessing of the track b, as in the embodiment shown in FIG. 1. At the same time, the control circuit 16 switches the switches 2, 6 and 7 into contacts p, p' and p", respectively and closes the switch 9. More specifically, reproducing operation of the track b is set once before erasing operation is started. The magnetic head 1 begins to be controlled in the on-track state in response to the tracking control signal of the tracking servo circuit 5.

When servo control is stabilized after a lapse of a predetermined period and the magnetic head 1 is controlled in the on-track state, the control circuit 16 opens the switch 9, as in the embodiment shown in FIG. 1, and outputs a reset signal to the peak detection and hold circuit 17.

Therefore, after the switch 9 is opened, the sample and hold circuit 8 holds the DC signal component DC' of the tracking control signal when the magnetic head 1 is in the on-track position and outputs the same to the contact e' on the side of erasing of the switch 6, as in the embodiment shown in FIG. 1.

On the other hand, the peak detection and hold circuit 17 is initiated by inputting the reset signal, the peak detection and hold circuit 17 detecting and holding the maximum amplitude value, i.e., the peak value of the signal AC of the A component outputted from the tracking servo circuit 5 during the on-track state.

The signal AC of the AC component during the on-track state is increased or decreased in amplitude in proportion to the amount of deviation from the average central position of the track b, i.e., the amount of track deviation.

Therefore, during one to several turns of the disc, the signal AC of the AC component corresponding to the measured maximum amount of track deviation is detected and held in the peak detection and hold circuit 17.

A signal with an amplitude corresponding to the amplitude of the signal AC of the held AC component is outputted from the peak detection and hold circuit 17 to the limiter 18.

Furthermore, an oscillating signal of the oscillator 19 set to, for example, 450 Hz is inputted to the limiter 18. The amplitude of the oscillating signal is set larger than that of an output of the peak detection and hold circuit 17.

The limiter 18 limits the amplitude of the oscillating signal of the oscillator 19 depending on the amplitude of the output of the peak detection and hold circuit 17 and outputs an AC signal AC" with 450 Hz having the amplitude of the signal AC of the AC component corresponding to the measured maximum amount of track deviation to a contact e" on the side of erasing of the switch 7.

Additionally, after one to several turns of the disc from the output of the above described reset signal, the control circuit 16 switches the switches 7 and 6 into the contacts e' and e" on the side of erasing, respectively, so that the magnetic head 1 begins to be tracking-controlled by the combined signal of the DC signal DC' of the sample and hold circuit 8 and the AC signal AC" of the limiter 18 in response to the switching.

When tracking control is started by the combined signal of the DC signal DC' and the AC signal AC", the control circuit 16 switches the switch 2 into the contact e on the side of erasing in order for the reproducing operation to be switched into an erasing operation in response to the switching of the switch 2. The erasing signal of the erasing circuit 3 is supplied to the magnetic head 1 through the switch 2, so that the record of the track b begins to be erased.

Therefore, at the time of erasing, the trace position of the magnetic head 1 is moved by tracking control based on the combined signal of the DC signal DC' and the AC signal AC' in a radial direction of the disc within a range of the measured maximum amount d of deviation of the track determined by the AC signal AC" with respect to the average central position of the track b determined by the DC signal DC', e.g., the maximum amount d of track deviation in FIG. 2, so that the record of the track b is surely erased without erasing the records of the adjacent tracks a and c using a simple structure. In addition, according to the embodiment shown in FIG. 4, the moving range of the magnetic head 1 is set by the measured actual maximum amount of track deviation, so that the erasing range is determined with higher accuracy than that in FIG. 1.

The frequency of the oscillating signal of the oscillator 19 is set arbitrarily based on a moving way of the magnetic head 1 at the time of erasing or the like.

Although in the above described embodiment, the present invention is applied to the magnetic disc of the electronic still camera, it may be applied to various discs of a magnetic type and an optical type or the like if they are erasable, in which case the head 1 can be replaced with the magnetic head, the optical head or the like depending on the respective discs.

Furthermore, a system for tracking control at the time of reproduction may be different from the Dither system according to the above described embodiment. For example, a pilot tracking system for performing tracking control utilizing a pilot signal for tracking control recorded on the track of the disc may be used.

The tracking servo means according to the present invention can comprise various tracking servo circuits for always outputting the tracking control signal which changes in amplitude following deviation between the trace position of the head and the position of the track under reproduction in response to the reproduced signal by the head. At that time, it is not necessary that the tracking control signal is separated into the DC component and the AC component to output the same, as in the above described embodiment.

If and when the tracking control signal outputted from the tracking servo means comprises the combined signal of the DC component and the AC component, it is desirable that a low pass filter is provided in a former stage of the sample and hold circuit 8 in FIG. 1 to extract only the DC component and apply the same to the sample and hold circuit 8, and a switch for switching the combined signal comprising the DC signal DC' and the AC signal AC' (AC'') and the tracking control signal outputted from the tracking servo circuit to output the same is provided instead of the switches 6 and 7 and the adder circuit 11.

Additionally, the head must be used for at least both reproduction and erasing and the head may be used for reproduction, erasing and recording.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc erasing apparatus for erasing selectively a record of each of a plurality of tracks formed concentrically on a disc, comprising:
   a head used for at least reproduction and erasing of the record of said track,
   head moving means for moving said head in a radial direction of said disc and movably controlling the trace position of said head on said disc,
   tracking servo means responsive to a signal reproduced from said track by said head for outputting a tracking control signal which changes in amplitude following deviation between the actual trace position of said head and the position of a track reproduced by said head, said tracking control signal including at least a direct current signal component,
   means for inputting an erase command signal,
   operation controlling means responsive to said erase command signal for performing reproducing operation by said head of the track to be erased, supplying said tracking control signal outputted from said tracking servo means to said head moving means to drive said head moving means, and switching said reproducing operation into erasing operation by said head after a lapse of a sufficient predetermined period to control the trace position of said head to the position of said track to be erased,
   signal holding means for holding said direct current signal component of said tracking control signal when said predetermined period is lapsed,
   alternating current generating means for generating an alternating current signal with a predetermined amplitude, and
   switching means for combining the direct current signal component held in said signal holding means with the alternating current signal generated by said alternating current generating means and supplying said head moving means with the combined signal instead of said tracking control signal to drive said head moving means.

2. A disc erasing apparatus in accordance with claim 1, wherein
   said tracking control signal further includes the alternating current signal component.

3. A disc erasing apparatus in accordance with claim 2, wherein
   said direct current signal component of said tracking control signal represents the average trace position of said head on said disc, and
   said alternating current signal component of said tracking control signal represents the amount of movement of said head from said average trace position.

4. A disc erasing apparatus in accordance with claim 1, wherein
   said erasing operation by said head is performed by recording a predetermined erasing signal.

5. A disc erasing apparatus in accordance with claim 1, wherein
   said predetermined amplitude of the alternating current signal generated from said alternating current generating means is set such that said head is moved by a range of the maximum amount of track deviation set in advance when the alternating current signal is applied to said head moving means.

6. A disc erasing apparatus in accordance with claim 1, wherein
   said head moving means comprises
      an electro-mechanical transducer means to which said head is attached, and
      a driving circuit responsive to said tracking control signal for applying a driving signal to said electro-mechanical transducer means.

7. A disc erasing apparatus in accordance with claim 6, wherein
   said electro-mechanical transducer means comprises a bimorph or a piezo-electric actuator of stacked type.

8. A disc erasing apparatus in accordance with claim 7, wherein
   said electro-mechanical transducer means is attached to an actuator for head access.

9. A disc erasing apparatus in accordance with claim 2, wherein
   said tracking servo means comprises tracking servo circuit of a Dither system.

10. A disc erasing apparatus in accordance with claim 9, wherein said tracking servo means outputs said DC signal component and said alternating current signal component separately, said signal holding means comprises a first switch for receiving said direct current signal component during said predetermined period, said switching means comprises
a second switch for selecting either the direct current signal component outputted from said tracking servo means or the direct current signal component held in said signal holding means,
a third switch for selecting either the alternating current signal component outputted from said tracking servo means or the alternating current signal generated from said alternating current generating means,
switching controlling means for controlling said second and third switches such that the direct current signal component and the alternating current signal component outputted from said tracking servo means are simultaneously selected during said predetermined period and the direct current signal component held in said signal holding means and the alternating current signal generated from said alternating current generating means may be simultaneously selected after a lapse of said predetermined period, and
adder means for combining signal components selected by said second and third switches and supplying the combined signal to said head moving means.

11. A disc erasing apparatus in accordance with claim 9, wherein
said tracking servo circuit of a Dither system comprises
means for envelope-detecting the signal reproduced from said track by said head,
means for extracting a component with a first frequency corresponding to the speed with which said head is moved in a radial direction of said disc from said reproduced envelope-detected signal,
means for generating a sine wave signal with said first frequency,
means for controlling the amplitude of said sine wave signal,
means for multiplying a signal of said extracted component with the first frequency by said sine wave signal,
means for extracting a signal component with a low frequency from the output of said multiplier,
means for integrating said extracted signal component with a low frequency and outputting the same as said direct current signal component of said tracking control signal,
means for extracting an alternating current signal component with a second frequency corresponding to the rotational frequency of said disc from the output of said multiplier,
means for amplifying said extracted alternating current signal component with the second frequency and adding the same to said sine wave signal, and
said switching means comprises
a fourth switch for disconnecting supply of said signal component with a low frequency to said integration means and causing said integration means to function as said signal holding means after a lapse of said predetermined period, and
fifth switches for disconnecting said extracted alternating current signal component with the second frequency and causing said sine wave signal generating means to function as said alternating current signal generating means after a lapse of said predetermined period.

12. A disc erasing apparatus in accordance with claim 1, wherein
said tracking servo means comprises a servo circuit of a pilot tracking system for performing tracking control utilizing a pilot signal for tracking control recorded on each track of said disc.

13. A disc erasing apparatus in accordance with claim 2, wherein
said tracking servo means outputs said tracking control signal as the combined signal of said direct current signal component and said alternating current signal component,
said signal holding means comprises means for extracting only said direct current signal component from said tracking control signal and holding the same,
said switching means comprises
means for combining the direct current signal component held in said signal holding means with the alternating current signal generated from said alternating current generating means,
a sixth switch for selecting either said combined signal or said tracking control signal, and
switching control means for controlling said sixth switch so that said tracking control signal may be selected during said predetermined period and said combined signal may be selected after a lapse of said predetermined period.

14. A disc erasing apparatus in accordance with claim 1, wherein
a predetermined amplitude of the alternating current signal generated from said alternating current generating means is such that said head is moved by the range of a measured maximum amount of track deviation when the alternating current signal is applied to said head moving means.

15. A disc erasing apparatus in accordance with claim 14, wherein said alternating current generating means comprises
a peak detection and hold circuit for detecting a maximum amplitude value of said alternating current signal component of said tracking control signal and holding the same after a lapse of said predetermined period,
means for supplying an oscillating signal with a constant frequency and amplitude, and
means for controlling the amplitude of said oscillating signal by said maximum amplitude value held in said peak detection and hold circuit and outputting the same.

16. A disc erasing apparatus in accordance with claim 15 wherein
the amplitude of said oscillating signal is set larger than said maximum amplitude value held in said peak detection and hold circuit.

17. A disc erasing apparatus in accordance with claim 1, wherein
said disc is a magnetic disc and said head is a magnetic head.

18. A disc erasing apparatus in accordance with claim 1, wherein
said disc is an optical disc and said head is an optical head.

19. A disc erasing apparatus in accordance with claim 1, wherein
signals for a field or a frame of a still picture are recorded on each track on said disc.

* * * * *